United States Patent
Thompson

(10) Patent No.: US 7,104,072 B2
(45) Date of Patent: Sep. 12, 2006

(54) COMBINED POWER MAIN ENGINE START SYSTEM

(75) Inventor: Robert G. Thompson, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 196 days.

(21) Appl. No.: 10/925,132

(22) Filed: Aug. 16, 2004

(65) Prior Publication Data

US 2006/0032234 A1 Feb. 16, 2006

(51) Int. Cl.
*F02C 7/26* (2006.01)

(52) U.S. Cl. .......................................... 60/786; 60/778

(58) Field of Classification Search .................. 60/778, 60/786, 787
See application file for complete search history.

(56) References Cited

U.S. PATENT DOCUMENTS

| | | | | | |
|---|---|---|---|---|---|
| 3,711,044 A | * | 1/1973 | Matulich | ................. | 244/118.5 |
| 4,116,006 A | * | 9/1978 | Wallis | .......................... | 60/709 |
| 5,003,767 A | * | 4/1991 | Rodgers | ....................... | 60/788 |
| 5,123,239 A | * | 6/1992 | Rodgers | ....................... | 60/778 |
| 5,131,225 A | * | 7/1992 | Roettger | ....................... | 60/785 |
| 5,165,232 A | * | 11/1992 | Amelio et al. | ................. | 60/416 |
| 5,174,109 A | * | 12/1992 | Lampe | ......................... | 60/788 |
| 5,184,458 A | * | 2/1993 | Lampe et al. | .................. | 60/787 |
| 5,245,820 A | * | 9/1993 | Zalewski et al. | ........... | 60/39.08 |
| 5,309,708 A | * | 5/1994 | Stewart et al. | ................. | 60/787 |
| 5,343,778 A | * | 9/1994 | Romero et al. | ................ | 74/661 |
| 5,408,821 A | * | 4/1995 | Romero et al. | ................ | 60/778 |
| 5,899,411 A | * | 5/1999 | Latos et al. | ................. | 244/53 A |
| 5,986,462 A | * | 11/1999 | Thomas et al. | ............. | 324/771 |
| 6,588,211 B1 | * | 7/2003 | Friebe et al. | .................. | 60/716 |
| 6,634,596 B1 | * | 10/2003 | Albero et al. | .............. | 244/53 A |
| 6,786,209 B1 | * | 9/2004 | Stewart | .................. | 123/568.11 |
| 6,829,899 B1 | * | 12/2004 | Benham et al. | ................ | 60/787 |

* cited by examiner

*Primary Examiner*—William H. Rodriguez
(74) *Attorney, Agent, or Firm*—Stephen G. Mican

(57) ABSTRACT

A starting system for starting the propulsion engines of gas turbine powered aircraft that combines power sources delivered by the APU so that essentially then entire power delivered by the APU for pneumatic, hydraulic and electric power is applied to corresponding starters on each propulsion engine during MES simultaneously.

27 Claims, 1 Drawing Sheet

COMBINED POWER MAIN ENGINE START SYSTEM

FIELD OF THE INVENTION

The invention relates to engine starting systems for aircraft, and more particularly to engine starting systems for starting gas turbine propulsion engines aboard aircraft.

BACKGROUND OF THE INVENTION

Modern aircraft secondary power systems are becoming large with increasing demands for electric power and large power for starting the prime propulsion engines. These aircraft have a gas turbine powered auxiliary power unit (APU) on board to provide electrical, hydraulic and pneumatic power for operating systems aboard the aircraft when the propulsion engines are shut down as well as to provide power for starting the propulsion engines. Typically, pneumatic power, provided by a load compressor within the APU, has been used to start the propulsion engines. The load compressor has also been used to provide compressed air for the environmental control system (ECS) aboard the aircraft before and after the propulsion engines are started.

The main engine start (MES) requires much more compressed air from the APU than the ECS load. Since the load compressor is used for both the MES mode and the ECS mode, the APU is sized well above the needs by the MES requirement. The APU is thus oversized for the ECS mode and it is heavier, more costly and less efficient than if it were sized to match the ECS load alone. The heavier APU and its support structure detract from the aircraft fuel load or payload. The excess APU weight therefore shortens the range of the aircraft or reduces its payload.

Although increasing power demands that are due to factors other than MES requirements, such as more electric power cabin services, added avionics functions and large radar load for some military aircraft are also driving up the size and weight of APUs for modern aircraft, by far the most significant factor is the MES requirements.

SUMMARY OF THE INVENTION

The invention maximises power delivered by the APU for starting propulsion engines by combining power sources delivered by the APU so that essentially then entire power delivered by the APU for pneumatic, hydraulic and electric power is applied to MES. This is accomplished by employing a combination of pneumatic, hydraulic and electric starters for each propulsion engine that the APU drives simultaneously.

In a preferred embodiment, the invention comprises a starting system for starting the propulsion engines of gas turbine powered aircraft comprising: an auxiliary power unit (APU) with a pneumatic supply source and an auxiliary supply source; at least one gas turbine propulsion engine with a pneumatic starter and an auxiliary starter; a pneumatic supply path for controlling and distributing pneumatic power from the pneumatic supply source to the pneumatic starter upon main engine start; and an auxiliary supply path for controlling and distributing auxiliary power from the auxiliary supply source to the auxiliary starter upon main engine start.

DETAILED DESCRIPTION OF THE INVENTION

Figure 1:
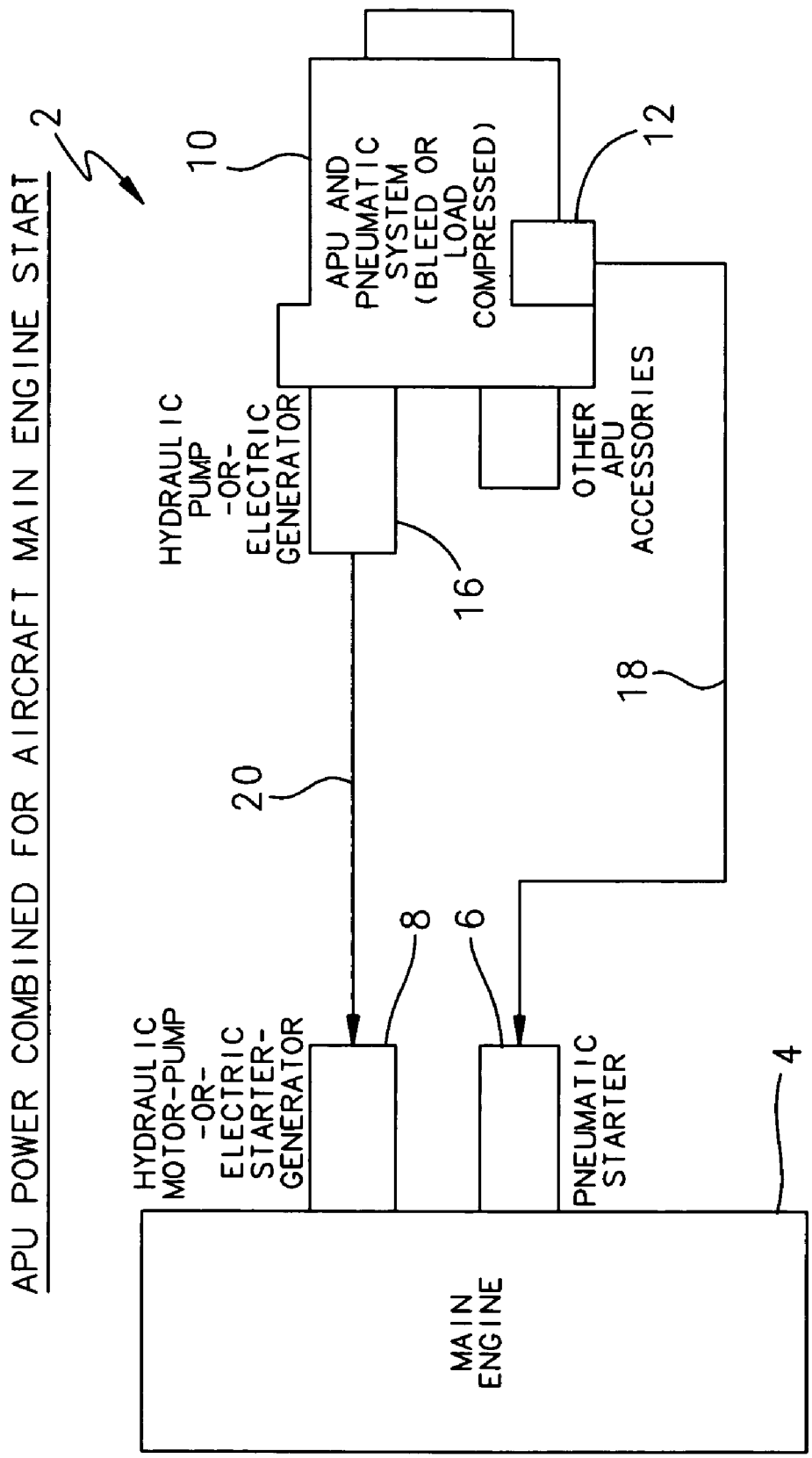
FIG. 1 is a block diagram of a combined power main engine start system for aircraft according to the invention.

FIG. 1 is a block diagram of a combined power main engine start system 2 for aircraft according to the invention. A gas turbine propulsion engine 4 for an aircraft has an associated pneumatic starter 6 and an auxiliary starter 8. The pneumatic starter 6 is typically a pneumatic motor. The auxiliary starter 8 may be a dynamoelectric machine, such as an electric motor or starter/generator, a hydraulic motor or motor/pump, or a combination of such electric and hydraulic devices.

An auxiliary pump unit (APU) 10 aboard the aircraft has a pneumatic supply source 12. The pneumatic supply source 12 typically comprises a load compressor or powerhead bleed air source that is part of the APU 10. The APU 10 also has an auxiliary supply source 16 that supplies auxiliary power. The auxiliary supply source 16 may comprise a dynamoelectric machine, such as an electric generator or starter/generator, a hydraulic pump or motor/pump, or a combination of such electric and hydraulic devices. The pneumatic supply source 12 is coupled to the pneumatic starter 8 through a pneumatic supply path 18 that controls and distributes the flow of pneumatic power from the pneumatic supply source 12 to the pneumatic starter 8. The auxiliary supply source 16 is coupled to the auxiliary starter 8 through an auxiliary supply path 20 that controls and distributes the flow of auxiliary power from the auxiliary supply source 16 to the auxiliary starter 8.

The pneumatic supply path 18 comprises pneumatic ductwork and valving to control the flow of pneumatic power from the pneumatic supply source 12 to the pneumatic starter 6. When the auxiliary starter 8 and the auxiliary supply source 16 are both electric, the auxiliary supply path 20 comprises electrical wiring and switching to control and distribute the electrical current flow from the auxiliary supply source 16 to the auxiliary starter 8. When the auxiliary starter 8 and the auxiliary supply source 16 are both hydraulic, the auxiliary supply path 20 comprises hydraulic tubing and valving to control and distribute the hydraulic fluid flow from the auxiliary supply source 16 to the auxiliary starter 8. When the auxiliary starter 8 and the auxiliary supply source 16 comprise both electric and hydraulic devices, the auxiliary supply path 20 comprises a combination of such electric current and hydraulic fluid flow control and distribution components.

During MES, the pneumatic supply path 18 regulates the flow of pneumatic power from the pneumatic supply source 12 to the pneumatic starter 6. Simultaneously, the auxiliary supply path 20 regulates the flow of auxiliary power from the auxiliary supply source 16 to the auxiliary starter 8. Preferably, during MES remaining electric and hydraulic loads aboard the aircraft are minimised or removed so that most of the power of the APU 10 is applied to starting the engine 4 during MES.

Since most of the power of the APU 10 is directed or redirected to starting the engine 4 during MES, the APU 10 may be downsized to a capacity wherein the combination of the pneumatic supply source 12 and the auxiliary supply source 16 matches the power needed by the engine 4 for MES, instead of requiring the pneumatic supply source 12 to meet the power requirements of the engine 4 for MES alone.

The size, weight and cost of the APU 10, the pneumatic starter 6, the pneumatic supply 18 and associated supply structure are thereby reduced.

Described above is a starting system for starting the propulsion engines of gas turbine powered aircraft that combines power sources delivered by the APU so that essentially then entire power delivered by the APU for pneumatic, hydraulic and electric power is applied to corresponding starters on each propulsion engine during MES simultaneously. It should be understood that these embodiments of the invention are only illustrative implementations of the invention, that the various parts and arrangement thereof may be changed or substituted, and that the invention is only limited by the scope of the attached claims.

What is claimed is:

1. A starting system for starting the propulsion engines of gas turbine powered aircraft comprising:
    an auxiliary power unit (APU) with a pneumatic supply source and an auxiliary supply source;
    at least one gas turbine propulsion engine with a pneumatic starter and an auxiliary starter;
    a pneumatic supply path for controlling and distributing pneumatic power from the pneumatic supply source to the pneumatic starter upon main engine start (MES); and
    an auxiliary supply path for controlling and distributing auxiliary power from the auxiliary supply source to the auxiliary starter upon MES.

2. The system of claim 1, wherein the auxiliary supply source and the auxiliary starter both comprise dynamoelectric machines and the auxiliary supply path comprises electrical wiring and switching to regulate the flow of electrical current from the auxiliary supply source to the auxiliary starter during MES.

3. The system of claim 2, wherein the auxiliary supply source comprises an electric generator.

4. The system of claim 2, wherein the auxiliary supply source comprises an electric starter/generator.

5. The system of claim 2, wherein the auxiliary starter comprises an electric motor.

6. The system of claim 2, wherein the auxiliary starter comprises an electric starter/generator.

7. The system of claim 1, wherein the auxiliary supply source comprises a hydraulic pump, the auxiliary starter comprises a hydraulic motor and the auxiliary supply path comprises hydraulic tubing and valving to regulate the flow of hydraulic fluid from the auxiliary supply source to the auxiliary starter during MES.

8. The system of claim 1, wherein the auxiliary supply source comprises a hydraulic pump, the auxiliary starter comprises a hydraulic motor/pump and the auxiliary supply path comprises hydraulic tubing and valving to regulate the flow of hydraulic fluid from the auxiliary supply source to the auxiliary starter during MES.

9. The system of claim 1, wherein the auxiliary supply source comprises a hydraulic motor/pump, the auxiliary starter comprises a hydraulic motor and the auxiliary supply path comprises hydraulic tubing and valving to regulate the flow of hydraulic fluid from the auxiliary supply source to the auxiliary starter during MES.

10. The system of claim 1, wherein the auxiliary supply source comprises a hydraulic motor/pump, the auxiliary starter comprises a hydraulic motor/pump and the auxiliary supply path comprises hydraulic tubing and valving to regulate the flow of hydraulic fluid from the auxiliary supply source to the auxiliary starter during MES.

11. The system of claim 1, wherein the auxiliary supply source comprises both a dynamoelectric machine and a hydraulic pump, the auxiliary starter comprises both a dynamoelectric machine and a hydraulic motor and the auxiliary supply path comprises both electrical wiring and switching to regulate the flow of electrical current from the auxiliary supply source to the electric portion of the auxiliary starter and hydraulic tubing and valving to regulate the flow of hydraulic fluid from the auxiliary supply source to the hydraulic portion of the auxiliary starter and during MES.

12. The system of claim 1, wherein the auxiliary supply source comprises both a dynamoelectric machine and a hydraulic motor/pump, the auxiliary starter comprises both a dynamoelectric machine and a hydraulic motor and the auxiliary supply path comprises both electrical wiring and switching to regulate the flow of electrical current from the auxiliary supply source to the electric portion of the auxiliary starter and hydraulic tubing and valving to regulate the flow of hydraulic fluid from the auxiliary supply source to the hydraulic portion of the auxiliary starter and during MES.

13. The system of claim 1, wherein the auxiliary supply source comprises both a dynamoelectric machine and a hydraulic motor/pump, the auxiliary starter comprises both a dynamoelectric machine and a hydraulic motor/pump and the auxiliary supply path comprises both electrical wiring and switching to regulate the flow of electrical current from the auxiliary supply source to the electric portion of the auxiliary starter and hydraulic tubing and valving to regulate the flow of hydraulic fluid from the auxiliary supply source to the hydraulic portion of the auxiliary starter and during MES.

14. A starting system for starting the propulsion engines of gas turbine powered aircraft comprising:
    an auxiliary power unit (APU) with a pneumatic supply source comprising a load compressor and an auxiliary supply source comprising a dynamoelectric machine;
    at least one gas turbine propulsion engine with a pneumatic starter and an auxiliary starter comprising a dynamoelectric machine;
    a pneumatic supply path comprising pneumatic ductwork and valving for controlling and distributing pneumatic power from the pneumatic supply source to the pneumatic starter upon main engine start (MES); and
    an auxiliary supply path comprising wiring and switching for controlling and distributing auxiliary power from the auxiliary supply source to the auxiliary starter upon MES.

15. The system of claim 14, wherein the auxiliary supply source comprises an electric generator.

16. The system of claim 14, wherein the auxiliary supply source comprises an electric starter/generator.

17. The system of claim 14, wherein the auxiliary starter comprises an electric motor.

18. The system of claim 14, wherein the auxiliary starter comprises an electric starter/generator.

19. A starting system for starting the propulsion engines of gas turbine powered aircraft comprising:
    an auxiliary power unit (APU) with a pneumatic supply source comprising a load compressor and an auxiliary supply source comprising a hydraulic pump;
    at least one gas turbine propulsion engine with a pneumatic starter and an auxiliary starter comprising a hydraulic motor;
    a pneumatic supply path comprising pneumatic ductwork and valving for controlling and distributing pneumatic power from the pneumatic supply source to the pneumatic starter upon main engine start (MES); and an auxiliary supply path comprising hydraulic valving and tubing for controlling and distributing auxiliary power from the auxiliary supply source to the auxiliary starter upon MES.

20. The system of claim 19, wherein the auxiliary supply source comprises a hydraulic motor/pump.

21. A starting system for starting the propulsion engines of gas turbine powered aircraft comprising:

an auxiliary power unit (APU) with a pneumatic supply source comprising a load compressor and an auxiliary supply source comprising a dynamoelectric machine and a hydraulic pump;

at least one gas turbine propulsion engine with a pneumatic starter and an auxiliary starter comprising a dynamoelectric machine and a hydraulic pump;

a pneumatic supply path comprising pneumatic ductwork and valving for controlling and distributing pneumatic power from the pneumatic supply source to the pneumatic starter upon main engine start (MES); and an auxiliary supply path comprising wiring and switching for controlling and distributing auxiliary power from the auxiliary supply source to the electric portion of the auxiliary starter and hydraulic valving and tubing for controlling and distributing auxiliary power from the auxiliary supply source to the hydraulic portion of the auxiliary starter upon MES.

22. The system of claim 21, wherein the electric portion of the auxiliary supply source comprises an electric generator.

23. The system of claim 21, wherein the electric portion of the auxiliary supply source comprises an electric starter/generator.

24. The system of claim 21, wherein the electric portion of the auxiliary starter comprises an electric starter motor.

25. The system of claim 21, wherein the electric portion of the auxiliary starter comprises an electric starter/generator.

26. The system of claim 21, wherein the hydraulic portion of the auxiliary source comprises a hydraulic motor/pump.

27. The system of claim 21, wherein the hydraulic portion of the auxiliary starter comprises a hydraulic motor/pump.

* * * * *